United States Patent
Kim et al.

(10) Patent No.: US 9,625,642 B2
(45) Date of Patent: Apr. 18, 2017

(54) LIGHT UNIT

(75) Inventors: Jong Sun Kim, Seoul (KR); Sang Jun Park, Seoul (KR); Jae Hyuk Jang, Seoul (KR); Hyung Min Park, Seoul (KR); Kyoung Soo Ahn, Seoul (KR); Jeong Oh Lee, Seoul (KR); Yong In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 365 days.

(21) Appl. No.: 13/885,368

(22) PCT Filed: Sep. 2, 2011

(86) PCT No.: PCT/KR2011/006537
§ 371 (c)(1),
(2), (4) Date: May 14, 2013

(87) PCT Pub. No.: WO2012/067340
PCT Pub. Date: May 24, 2012

(65) Prior Publication Data
US 2013/0242604 A1    Sep. 19, 2013

(30) Foreign Application Priority Data

Nov. 15, 2010  (KR) .................. 10-2010-0113330
Nov. 15, 2010  (KR) .................. 10-2010-0113331

(51) Int. Cl.
*F21V 7/04*    (2006.01)
*F21V 8/00*    (2006.01)
*G02F 1/1335*  (2006.01)

(52) U.S. Cl.
CPC .......... *G02B 6/0073* (2013.01); *G02B 6/0021* (2013.01); *G02B 6/0068* (2013.01);
(Continued)

(58) Field of Classification Search
CPC .... G02B 6/0021; G02B 6/0073; G02B 6/004; G02B 6/0041; G02F 1/133606; G02F 2001/133607
(Continued)

(56) References Cited

U.S. PATENT DOCUMENTS 7,780,306 B2    8/2010  Hoshi
2006/0255711 A1  11/2006  Dejima et al.
(Continued)

FOREIGN PATENT DOCUMENTS

CN    101295045 A    10/2008
CN    101344609 A     1/2009
(Continued)

OTHER PUBLICATIONS

International Search Report in International Application No. PCT/KR2011/006537, filed Sep. 2, 2011.
(Continued)

*Primary Examiner* — Peggy Neils
*Assistant Examiner* — William N Harris
(74) *Attorney, Agent, or Firm* — Saliwanchik, Lloyd & Eisenschenk (57) ABSTRACT

A light unit is provided. The light unit includes a PCB mounted with a plurality of LEDs, and a light guide member having a plurality of reception grooves piercing therethrough and receiving the LEDs, wherein the light guide member includes one surface and the other surface opposite to the one surface, and the one surface of the light guide member is further coated with the resin material. The reception grooves are formed in the light guide member and are filled with a fluid resin material, thus preventing the damage to the LED caused by the difference between the thermal expansion rates of the components such as the light guide member, the reflection film and the PCB.

17 Claims, 5 Drawing Sheets

(52) U.S. Cl.
CPC ......... *G02B 6/0083* (2013.01); *G02B 6/0091* (2013.01); *G02F 1/133606* (2013.01)

(58) Field of Classification Search
USPC ........................................ 362/606, 608, 612
See application file for complete search history.

(56) References Cited

U.S. PATENT DOCUMENTS

| | | | | |
|---|---|---|---|---|
| 2007/0121340 | A1* | 5/2007 | Hoshi | G02B 6/0018 362/600 |
| 2009/0016067 | A1 | 1/2009 | Chang | |
| 2009/0207584 | A1* | 8/2009 | Shiau et al. | 362/97.1 |
| 2010/0039797 | A1 | 2/2010 | Shinkai et al. | |
| 2010/0265694 | A1* | 10/2010 | Kim et al. | 362/97.1 |
| 2011/0037740 | A1* | 2/2011 | Yamaguchi | 345/204 |
| 2011/0090425 | A1* | 4/2011 | Nakagome | 349/64 |

FOREIGN PATENT DOCUMENTS

| | | |
|---|---|---|
| CN | 101649969 A | 2/2010 |
| CN | 101836037 A | 9/2010 |
| JP | 2001-035228 A | 2/2001 |
| JP | 2004-241237 A | 8/2004 |
| JP | 2005-353649 A | 12/2005 |
| JP | 2006-202533 A | 8/2006 |
| JP | 2006-291064 A | 10/2006 |
| JP | 2006-302687 A | 11/2006 |
| JP | 2007-149451 A | 6/2007 |
| JP | 2008-186656 A | 8/2008 |
| JP | 2008-305714 A | 12/2008 |
| JP | 2009-076349 A | 4/2009 |
| JP | 2009-272251 A | 11/2009 |
| JP | 2009-289701 A | 12/2009 |
| KR | 10-2009-0064258 A | 6/2009 |
| KR | 10-2009-0073452 A | 7/2009 |
| TW | M370050 U | 12/2009 |
| WO | WO-2008-078077 A1 | 7/2008 |
| WO | WO-2010-070885 A1 | 6/2010 |
| WO | WO-2012-070765 A1 | 5/2012 |

OTHER PUBLICATIONS

European Search Report dated Jan. 15, 2015 in European Application No. 11841601.5.
Japanese Office Action dated Feb. 10, 2015 in Japanese Application No. 2013-538624.
Chinese Office Action dated Jan. 6, 2015 in Chinese Application No. 201180055040.0.

* cited by examiner

35~70 degrees
→ Low density: 35~50 degrees
→ High density: 50~70 degrees

LIGHT UNIT

CROSS-REFERENCE TO RELATED APPLICATIONS

This application is the U.S. national stage application of International patent application No. PCT/KR2011/006537, filed Sep. 2, 2011, which claims priority to Korean Application Nos. 10-2010-0113330, filed Nov. 15, 2010, and 10-2010-0113331, filed Nov. 15, 2010, the disclosures of each of which are incorporated herein by reference in their entirety.

TECHNICAL FIELD

The present invention relates to a light unit, and more particularly, to a light unit that can prevent the damage to a Light Emitting Diode (LED) caused by heat and impact, remove hot spots, and improve optical efficiency.

BACKGROUND ART

A light unit uniformly illuminates a rear side of a Liquid Crystal Display (LCD), which is not self-luminous, in order to show a display image. A light guide plate is included in the light unit to provide uniform illumination and brightness, which may be a plastic lens that uniformly transmits light, emitted by a light source (e.g., an LED), to the entire surface of the LCD.

Figure 1:
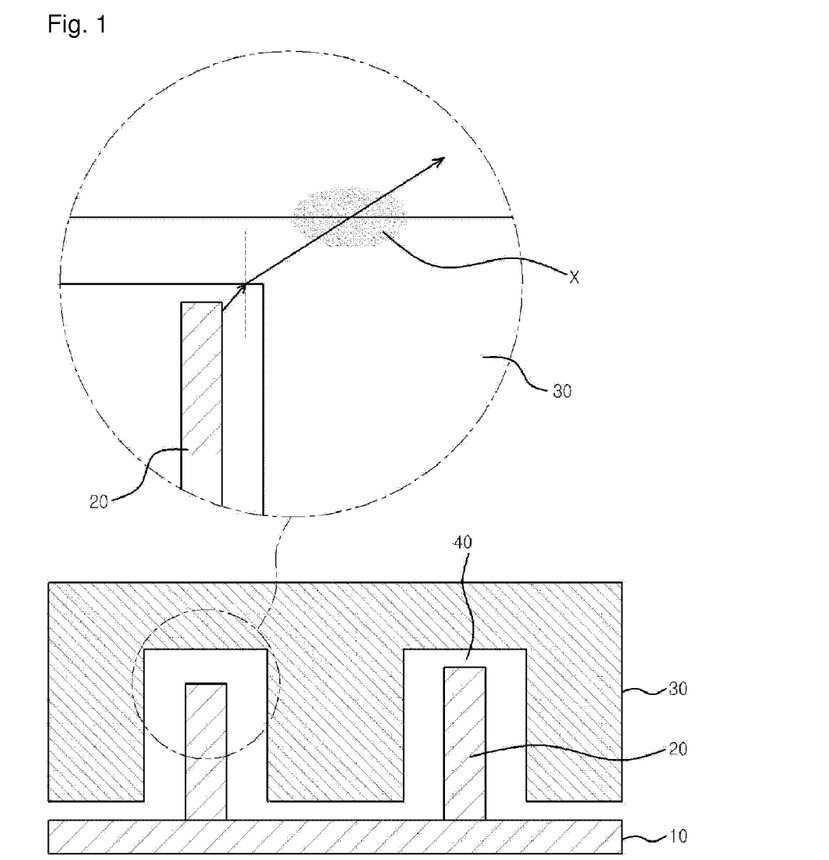
FIG. 1 illustrates a structure of a light unit using an LED as a light source.

FIG. 1 illustrates a structure of a light unit using an LED as a light source. As illustrated in FIG. 1, a plurality of LEDs 20 are provided on a printed circuit board (PCB) 10, and a light guide plate 30 is provided to transmit light, emitted by the LEDs 20, to the top of the light unit. Recently, continuous attempts are made to use LEDs as a light source to perform a uniform surface light emission on the entire light emission surface. In this case, a plurality of LEDs are arranged on a plane surface, and are inserted into concave holes formed at a light guide plate.

However, if an LED is inserted into a light guide plate, a hot spot X occurs due to heat at a surface near to the LED. This hot spot X relatively increases the brightness in a region near to the LED, causing a brightness spot.

Also, the high-temperature heat or thermal shock occurring at the LED causes the thermal expansion of a light guide plate, a reflection film and a PCB. In this case, the LED is damaged by the difference between the thermal expansion rates of the respective components.

DISCLOSURE OF INVENTION

Technical Problem

An aspect of the present invention is directed to a light unit that has a reception groove formed in a light guide member to receive a LED and filled with a fluid resin material, thus preventing the damage to the LED caused by the difference between the thermal expansion rates of components such as a light guide member, a reflection film and a PCB.

An aspect of the present invention is directed to a light unit that can efficiently extract and transmit light by the light diffusing, refracting and scattering characteristics of the resin material, and can significantly reduce hot spots by proving a microlens array film having diffusion patterns or diffusion beads and a light diffusing function.

Solution to Problem

The present invention provides a light unit including: a PCB mounted with a plurality of LEDs; and a light guide member having a plurality of reception grooves receiving the LEDs, wherein the reception grooves are filled with a resin material.

According to an embodiment of the present invention, a light unit includes: a PCB mounted with a plurality of LEDs; and a light guide member having a plurality of reception grooves piercing therethrough and receiving the LEDs, wherein the light guide member includes one surface and the other surface opposite to the one surface, and the one surface of the light guide member is further coated with the resin material.

The resin material may include a UV-curing resin material and may further include a plurality of beads. The optical efficiency can be improved by controlling the weight of the beads.

In addition, the light extraction efficiency can be improved by controlling the density of various optical patterns on the light guide member, and the optical efficiency can be improved by stacking an optical film layer on the top surface of the light guide member.

Advantageous Effects of Invention

As described above, the present invention forms a reception groove in a light guide member to receive a LED and fills the reception groove with a fluid resin material, thus preventing the damage to the LED caused by the difference between the thermal expansion rates of components such as a light guide member, a reflection film and a PCB.

In addition, the present invention can efficiently extract and transmit light by the light diffusing, refracting and scattering characteristics of the resin material.

In particular, the present invention can significantly reduce hot spots by providing a microlens array film having diffusion patterns or diffusion beads and a light diffusing function of the resin material.

BRIEF DESCRIPTION OF DRAWINGS

The above and other aspects, features and advantages of certain exemplary embodiments of the present invention will be more apparent from the following description taken in conjunction with the accompanying drawings, in which.

REFERENCE NUMERALS

110: Printed circuit board
120: LED
130: Light guide member

140: Reception groove
150: Resin material
151: Bead
160: Optical film layer
Y1: First density pattern region
Y2: Second density pattern region
X1: Third density pattern region
X2: Fourth density pattern region
Z1: Fifth density pattern region
Z2: Sixth density pattern region Best Mode for Carrying out the Invention The present invention forms a reception groove in a light guide member to receive a LED and fills the reception groove with a fluid resin material, thus preventing the damage to the LED caused by the difference between the thermal expansion rates of components such as a light guide member, a reflection film and a PCB, improving the light extraction efficiency and preventing the occurrence of a hot spot.

To this end, the present invention provides a light unit including: a PCB mounted with a plurality of LEDs; and a light guide member having a plurality of reception grooves receiving the LEDs, wherein the reception grooves are filled with a resin material.

In particular, the reception grooves are formed to pierce the light guide member, and one surface of the light guide member and the reception grooves are filled with the reason material.

Mode for the Invention

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

1. First Embodiment

Figure 2:
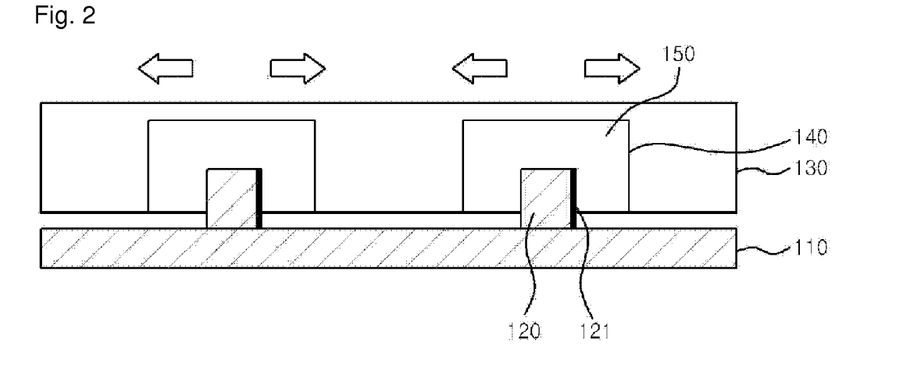
FIG. 2 is a cross-sectional conceptual diagram illustrating a structure of a light unit according to an embodiment of the present invention.

FIG. 2 is a cross-sectional conceptual diagram illustrating a structure of a light unit according to a first embodiment of the present invention.

Referring to FIG. 2, a light unit according to a first embodiment of the present invention includes a PCB 110 mounted with a plurality of LEDs 120; and a light guide member 130 having a plurality of reception grooves 140 receiving the LEDs 120, wherein the reception grooves 140 are filled with a resin material 150. For example, the resin material may be a fluid ultraviolet (UV)-curing resin material. However, the resin material is not limited thereto and may be any resin material that can diffuse light and has a predetermined fluidity.

The LED 120 may be a side view LED that has a light emission surface 121 is formed in the direction of the sidewall of a reception groove 140. That is, the light emitted by an LED source 130 does not travel directly to the top but travels toward the sidewall. In an exemplary embodiment, the reception groove 140 may have an opened bottom structure and a closed top structure. In another exemplary embodiment, the reception groove 140 may have an opened top structure.

As described above, the resin material may be a fluid UV-curing resin material, but the resin material is not limited thereto and may be any resin material that can diffuse light and has a predetermined fluidity. The use of the resin material can prevent the damage to the LED that may be caused by the thermal expansion of the PCB mounted with the LED or the reflection film or may be caused by the high-temperature expansion of the light guide member.

In particular, since the resin material 150 is filled in the reception groove contacting the light emission surface of the LED, it may have a light diffusing function of a transparent material. To this end, diffusion beads may be further included in the resin material 150. The diffusion beads may be included at 0.01% to 0.3% with respect to the total weight of the resin material. The light emitted by the LED in the lateral direction is diffused and reflected by the resin material 150 and the beads and travels upwards, thus making it possible to significantly reduce a hot-spot phenomenon while increasing a diffusion phenomenon.

An embodiment of the resin material 150 will be described below in detail. That is, the resin material according to the present invention may be various UV-curing fluid resins, and may be formed of various materials to improve the light diffusion and reduce the occurrence of hot spots, which will be described below.

The use of the above resin material can remove a hot-spot phenomenon caused by a light diffusion effect, prevent a decrease in the surface adhesion of the oligomer type, and prevent a decrease in the mass production rate caused by longtime curing, thus making it possible to satisfy the mass production rate, the reliability and the adhesion characteristics with respect to the hot spot removing groove of the light guide member.

2. Second Embodiment

Figure 3:
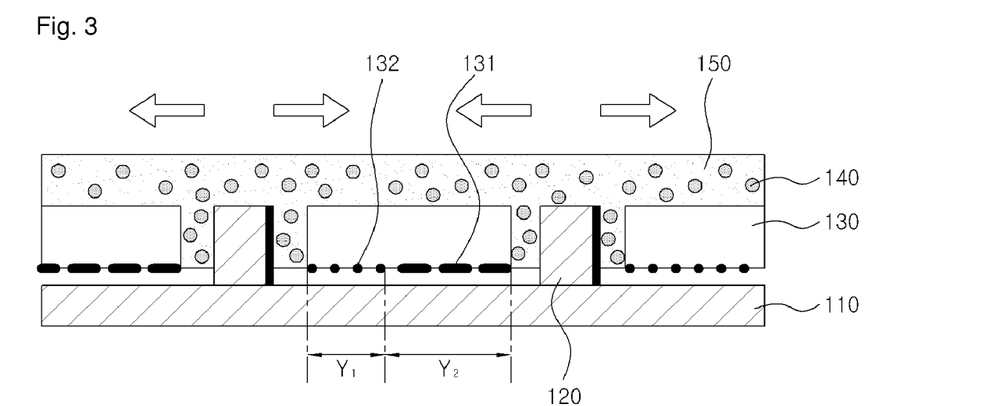
FIG. 3 is a cross-sectional conceptual diagram illustrating a structure of a light unit according to an embodiment of the present invention.

FIG. 3 is a cross-sectional conceptual diagram illustrating a structure of a light unit according to a second embodiment of the present invention.

Referring to FIG. 3, the light unit according to the second embodiment of the present invention is characterized in that the reception grooves are formed to pierce the light guide member in the structure of the first embodiment and a resin layer is formed therein.

Specifically, the light unit includes: a PCB 110 mounted with a plurality of LEDs 120; and a light guide member 130 having a plurality of reception grooves 140 receiving the LEDs 120, In particular, the light guide member 130 may have one surface and the other surface opposite to the one surface, and the one surface of the light guide member and the reception grooves may be coated with a resin material. In this case, the reception grooves 140 may be formed to pierce the light guide member, and the resin material may be formed on the one surface of the light guide member and the reception grooves.

In this case, the resin material 150 may be a UV-curing resin material. However, the resin material is not limited thereto and may be any resin material that can diffuse light and has a predetermined fluidity. In particular, since the resin material 150 is filled in the reception groove contacting the light emission surface of the LED, it may have a light diffusing function of a transparent material. To this end, diffusion beads 151 may be further included in the resin material 150. The diffusion beads may be included at 0.01% to 0.3% with respect to the total weight of the resin material. The light emitted by the LED in the lateral direction is diffused and reflected by the resin material 150 and the beads 151 and travels upwards, thus making it possible to significantly reduce a hot-spot phenomenon while increasing a diffusion phenomenon. The directions of arrows over the resin material layer illustrated in FIG. 2 represent the buffering operation of the resin material in a thermal expansion process.

The LED 120 may be a side view LED that has a light emission surface 121 is formed in the direction of the sidewall of a reception groove 140. That is, the light emitted by an LED source 130 does not travel directly to the top but travels toward the sidewall.

Also, optical patterns 131 and 132 may be formed on the other surface (bottom surface) of the light guide member of the light unit. Specifically, optical patterns may be formed on the other surface (bottom surface) of the light guide member 130, wherein they may be formed on the surface of a region where the reception groove is not formed.

Specifically, a first density pattern region Y1 and a second density pattern region Y2 having a higher pattern density than the first density pattern region Y1 are formed on the other surface of the light guide member 130, and the first density pattern region Y1 may be nearer to the light emission surface of the LED than the second density pattern region Y2. In this case, the first and second density pattern regions may include a plurality of independent concave patterns that overlap each other or are spaced apart from each other.

That is, the first and second density pattern regions of the light guide member 130 may be formed to have various sectional shapes (e.g., semicircle, ellipse, and an irregular shape) toward the inside of the surface of the light guide member. In an exemplary embodiment of the present invention, the first and second density pattern regions may include polygonal pyramid patterns or hemispherical patterns.

In particular, the first density pattern region Y1 can improve the extraction efficiency of light from the LED to increase the light uniformity. Also, the second density pattern region Y2 can have a higher pattern density than the first density pattern region, to improve the light diffusion and scattering.

The structure of the first and second density pattern regions in the second embodiment may also be implemented on the surface of the light guide member of the first embodiment.

3. Third Embodiment

Figure 4:
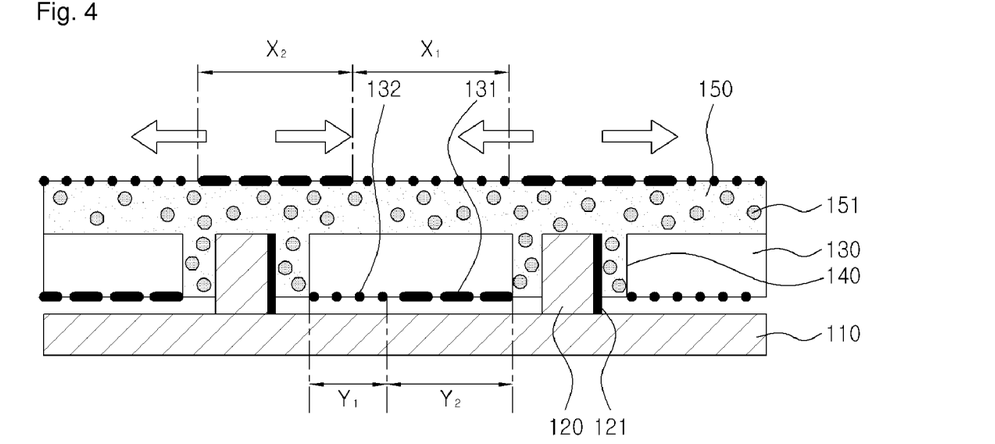
FIGS. 4 to 9 are conceptual diagrams illustrating a structure of a light unit according to other embodiments of the present invention.

FIG. 4 is a cross-sectional conceptual diagram illustrating a structure of a light unit according to a modification of the second embodiment of FIG. 3.

Other components are identical in the embodiment of FIG. 3, but an optical pattern may be further foamed on the top surface of the resin material 150. That is, an optical pattern may be formed on the top surface of a layer of the resin material 150 formed on one surface of the light guide member 130. Specifically, a third density pattern region X1 and a fourth density pattern region X2 having a higher pattern density than the third density pattern region are formed, the fourth density pattern region X2 may be nearer to the light emission surface of the LED than the third density pattern region X1.

Specifically, a third density pattern region X1 and a fourth density pattern region X2 having a higher pattern density than the first density pattern region are formed on the resin layer stacked on one surface (the top surface) of the light guide member 130. In this case, the fourth density pattern region may be nearer to the light emission surface of the LED than the third density pattern region X1.

The optical patterns constituting the third and fourth density pattern regions X1 and X2 may include a plurality of convex protrusion patterns that overlap each other or are spaced apart from each other. For example, the second density pattern region X2 has a higher pattern density than the first density pattern region X1, wherein the convex protrusion patterns may be formed more densely or some of the protrusion patterns may overlap each other to control the pattern density.

In this case, the fourth density pattern region X2 may be nearer to the light emission surface of the LED than the third density pattern region X1. That is, the fourth density pattern region X2 may be formed at the side near to the light emission surface of the LED, and the third density pattern region X1 may be formed at the side remote from the light emission surface of the LED. The fourth density pattern region X1 formed on the top surface of the light guide member is implemented in a high-density pattern or an overlapping pattern, and is disposed near the light emission surface of the LED to greatly diffuse or scatter the incident strong light, thus making it possible to reduce the formation of hot spots. In addition, the fourth density pattern region X2 is formed on the surface of the light guide member of the vertically upper direction of the formation position of the reception groove, and may be formed in a region within ⅕ of a first distance d1 to the adjacent reception groove. The formation limit point of the fourth density pattern is formed at a distance X3 within 10 mm from the light emission surface of the LED to remove the occurrence of hot spots.

On the other hand, the third density pattern region X1 is formed to have a single structure including an independent convex protrusion pattern, thus making it possible to reduce the pattern density, transmit the emitted light to a longer distance, increase the light extraction efficiency, and improve the light uniformity.

The structure of the first to fourth density pattern regions in the third embodiment may also be implemented on the surface of the light guide member of the first embodiment. However, in this case, the third and fourth density pattern regions are formed directly on the top surface (one surface) of the light guide member 130 of FIG. 2.

4. Fourth Embodiment

Figure 5:
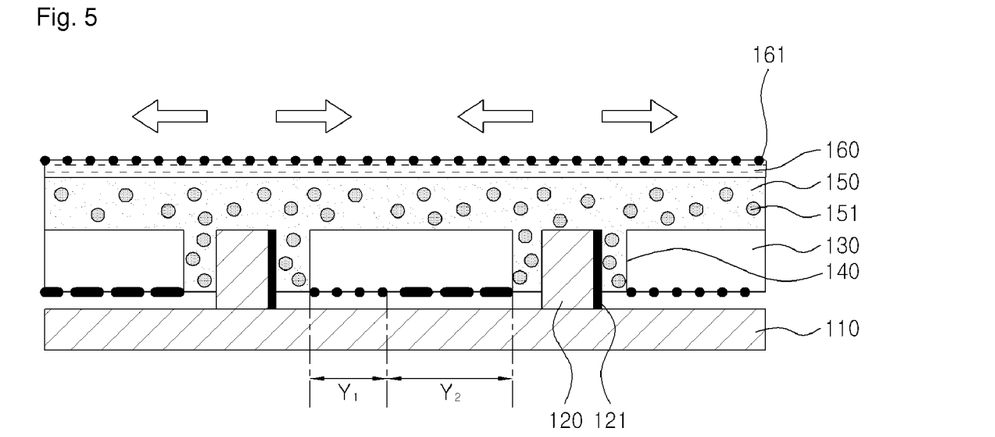

FIG. 5 is a cross-sectional conceptual diagram illustrating another modified embodiment of the backlight unit according to the present invention.

The structure of FIG. 5 is substantially identical to the structure of FIG. 3. However, it may be modified into a structure including an optical film layer 160 including a microlens array pattern 161 stacked on the top surface of the resin material layer 150 stacked on one surface of the light guide plate 130.

In this case, the microlens array pattern 161 may include various optical patterns to diffuse light.

Figure 6:
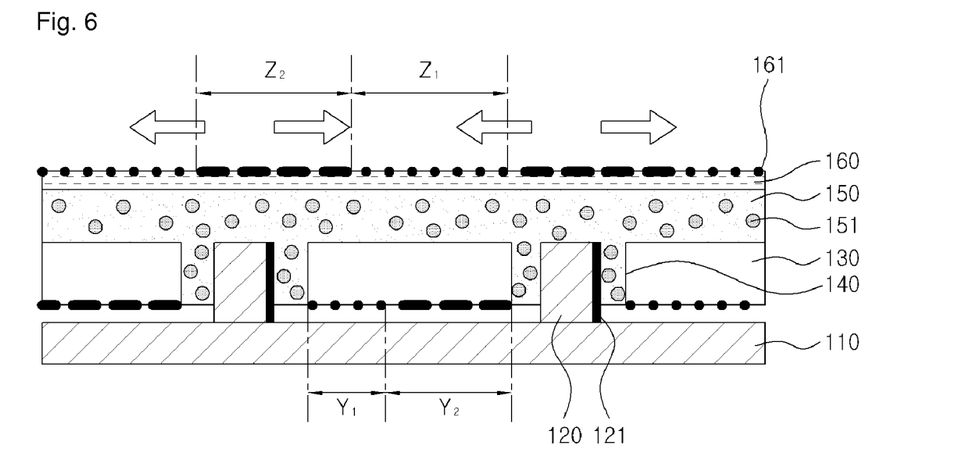

Moreover, as illustrated in FIG. 6, the arrangement density of the microlens array pattern 161 may be controlled to form a fifth density pattern region Z1 and a sixth density pattern region Z2 having a higher pattern density than the fifth density pattern region Z1, and to dispose the sixth density pattern region nearer to the light emission surface of the LED than the fifth density pattern region Z1.

Figure 7:
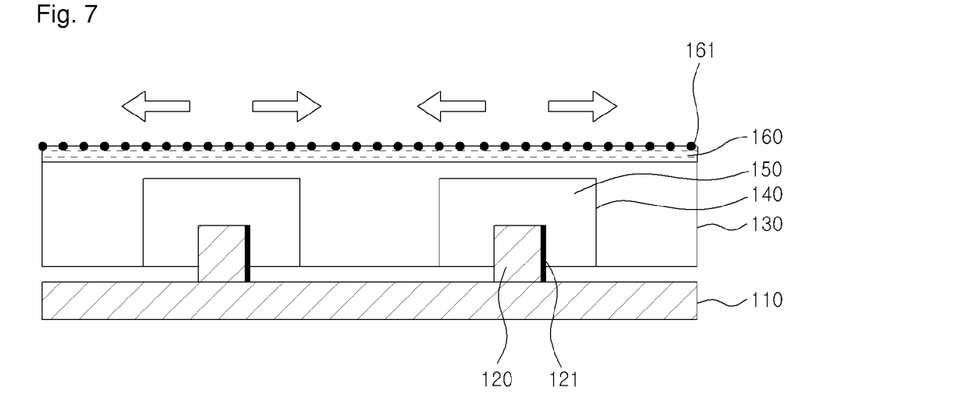
Figure 8:
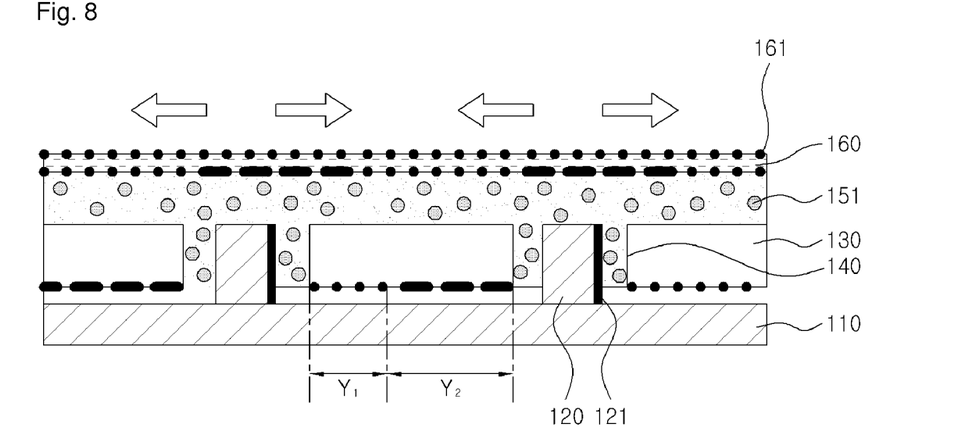

The structure of the fourth embodiment including the optical film layer 160 including the microlens array pattern 161 may also be applied to the structure of FIG. 2 of the first embodiment as illustrated in FIG. 7. Moreover, as illustrated in FIG. 8, the structure of stacking the optical film layer 160 including the microlens array pattern 161 may also be applied to the structure of FIG. 4.

5. Embodiment of Arrangement of Optical Patterns

Embodiments of the optical patterns included in the first and second density pattern regions formed on the other surface of the light guide member or in the third and fourth density pattern regions formed on the top surface of the resin layer or the top surface of the optical film layer in the second to fourth embodiments will be described below in detail.

In the above embodiments, the optical patterns of the first and second density pattern regions include convex protrusion patterns, and the optical patterns of the third and fourth density pattern regions include concave patterns. However, the optical patterns of the first and second density pattern regions may have the same pattern shape as the optical patterns of the third and fourth density pattern regions, with the exception of a difference in the concave/convex structure.

FIG. 9A illustrates tetragonal pyramid patterns as an example of the polygonal pyramid patterns in the density pattern region. The left of FIG. 9A illustrates a structure of tetragonal pyramid patterns that are integrated at a high density, and the right of FIG. 9A illustrates a structure of tetragonal pyramid patterns that are disposed to partially overlap each other to increase the pattern density. Other examples of the polygonal pyramid pattern include a triangular pyramid pattern, a hexagonal pyramid pattern, and an octagonal pyramid pattern. Herein, the term 'tetragonal pyramid' is used to denote a pyramid having a pointed vertex.

In addition, as illustrated in FIG. 9B, the optical patterns may include hemispherical patterns. The hemispherical patterns may be integrated at a high density or may be disposed to partially overlap each other to increase the pattern density. Other examples of the hemispherical pattern include a hemi ellipsoidal pattern and various three-dimensional patterns that do not have a pointed vertex.

Figure 9:
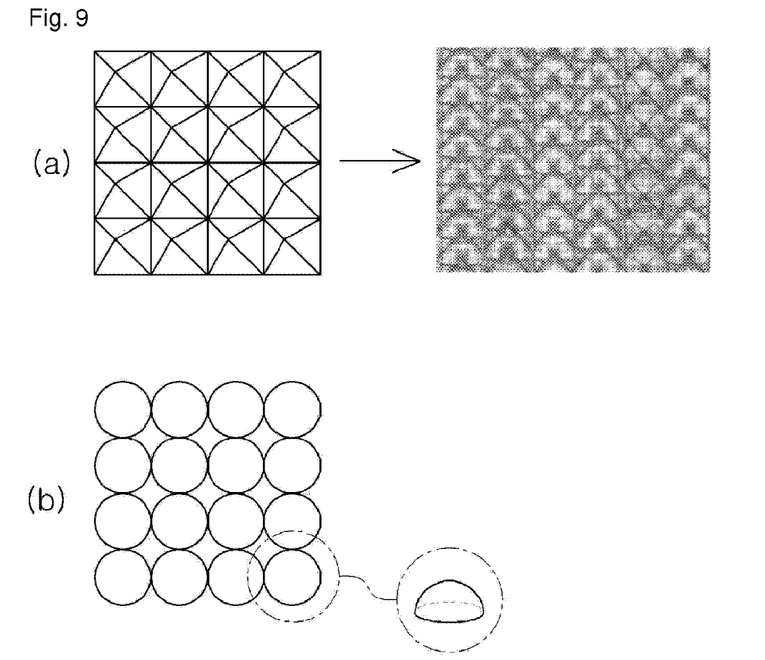
Figure 10:
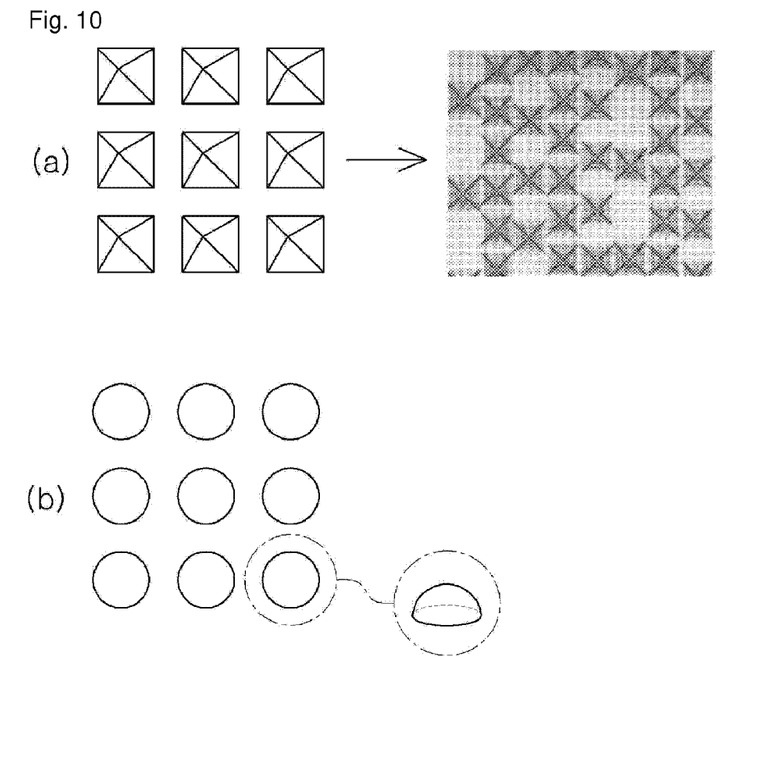
FIGS. 10 and 11 illustrate examples of optical patterns in the light unit according to embodiments of the present invention.

FIGS. 10A and 10B illustrate examples of arranging tetragonal pyramid patterns or hemispherical patterns at a low density in FIG. 9.

Figure 11:
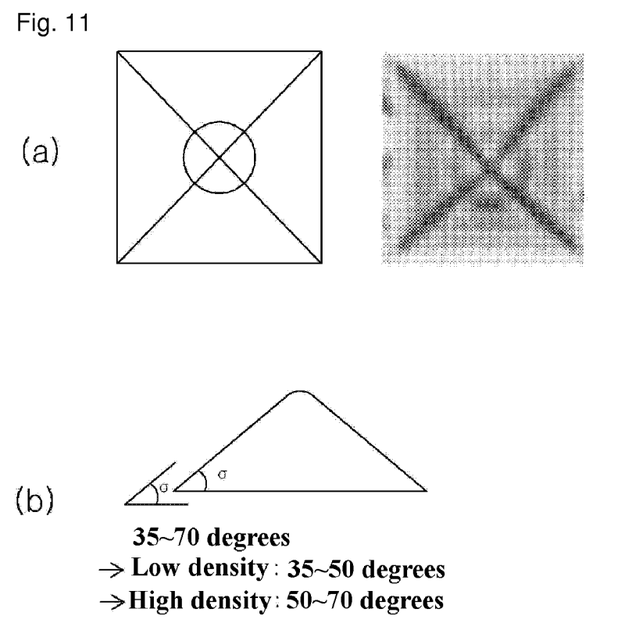

If the optical patterns include convex or concave polygonal pyramid patterns as illustrated in FIG. 11A, a bottom inclination angle σ of the polygonal pyramid pattern may have a value of 35 to 70 degrees as illustrated in FIG. 11B. Herein, the bottom inclination angle may be controlled to control the pattern density.

For example, in the case of the tetragonal pyramid pattern, the pattern may be formed to have a bottom inclination angle of 35 to 50 degrees for low-density arrangement, and may be formed to have a bottom inclination angle of 50 to 70 degrees for high-density arrangement.

6. Modified Embodiment of Resin Material

The resin material stacked in and on the reception grooves in the first to fourth embodiments may be various UV-curing fluid resins, and may be formed of the following material in order to improve the light diffusion and reduce the occurrence of hot spots.

For example, the resin material may include a resin having urethane acrylate oligomer as a main material. For example, the resin material may include a mixture of urethane acrylate oligomer (compound oligomer) and polymer type (polyacryl). The resin material may further include a monomer that is a mixture of low-boiling-point diluted reactive monomers such as IBOA (isobornyl acrylate), HPA (Hydroxylpropyl acrylate), and 2-HEA (2-hydroxyethyl acrylate), and a photo initiator (e.g., 1-hydroxycyclohexyl phenyl-ketone) or an antioxidant may be mixed as an additive.

Specifically, the resin layer may include a synthetic resin including a mixture of oligomer and polymer resin (polymer type). In particular, it may include a mixture of oligomer and polymer resin (polymer type), monomer, and additive.

In this case, the oligomer and the polymer resin may include a mixture of 10~21% urethane acrylate oligomer and 10~21% polyacryl. In addition, the monomer is a low-boiling-point diluted reactive monomer and may include a mixture of 10~21% IBOA (isobornyl Acrylate), 10~21% HPA (Hydroxypropyl Acrylate), and 10~21% 2-HEA (2-Hydroxyethyl Acrylate). Herein, 1~5% photo initiator may be added to initiate the photo reactivity, and 1~5% antioxidant may be added to improve a yellowing phenomenon.

The use of the above resin material can remove a hot-spot phenomenon caused by a light diffusion effect, prevent a decrease in the surface adhesion of the oligomer type, and prevent a decrease in the mass production rate caused by longtime curing, thus making it possible to satisfy the mass production rate, the reliability and the adhesion characteristics with respect to the hot spot removing groove of the light guide member.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A light unit comprising:
   a printed circuit board (PCB) mounted with a plurality of light emitting diodes (LEDs); and
   a light guide member having a plurality of reception grooves receiving the LEDs,
   wherein the reception grooves are filled with a resin material,
   wherein the resin material has a predetermined fluidity and is configured to diffuse light emitted from the LEDs,
   wherein the resin material is in direct physical contact with the light guide member,
   wherein a bottom surface of the resin material lies in a same plane as a bottom surface of the light guide member,
   wherein the light guide member includes a first surface and a second surface opposite to the first surface,
   wherein the second surface of the light guide member includes a first density pattern region and a second density pattern region, and
   wherein the second density pattern region has a higher pattern density than the first density pattern region,
   wherein the first density pattern region and the second density pattern region comprise convex polygonal pyramid patterns, a bottom inclination angle of the polygonal pyramid pattern of the first density pattern region has a value of 35 to 50 degrees, and a bottom inclination angle of the polygonal pyramid pattern of the second density pattern region has a value of 50 to 70 degrees.

2. The light unit of claim 1, wherein the reception grooves are formed to pierce the light guide member, and the first surface of the light guide member is further coated with the resin material.

3. The light unit of claim 1, wherein the resin material comprises an ultraviolet (UV)-curing resin material.

4. The light unit of claim 3, further comprising a plurality of light-diffusing beads included in the resin material.

5. The light unit of claim 4, wherein the beads are included at 0.01% to 0.3% with respect to the total weight of the resin material.

6. The light unit of claim 1, wherein the first density pattern region is nearer to a light emission surface of the LED than is the second density pattern region.

7. The light unit of claim 6, wherein the first density pattern region and the second density pattern region comprise a plurality of concave patterns that overlap each other or are spaced apart from each other.

8. The light unit of claim 7, wherein the concave patterns comprise concave polygonal pyramid patterns or hemispherical patterns toward the inside of the surface of the light guide member.

9. A light unit comprising:
a printed circuit board (PCB) mounted with a plurality of light emitting diodes (LEDs); and
a light guide member having a plurality of reception grooves receiving the LEDs;
wherein the reception grooves are filled with a resin material;
wherein the reception grooves are formed to pierce the light guide member, the light guide member includes a first surface and a second surface opposite to the first surface, and the first surface of the light guide member is further coated with the resin material;
wherein a first density pattern region and a second density pattern region, which has a higher pattern density than the first density pattern region, are formed on the second surface of the light guide member, and the first density pattern region is nearer to a light emission surface of the LED than is the second density pattern region, and
wherein a third density pattern region, and a fourth density pattern region that has a higher pattern density than the third density pattern region, are formed on the first surface of the light guide member or on a top surface of the resin material layer formed on the first surface of the light guide member, and the fourth density pattern region is nearer to the light emission surface of the LED than is the third density pattern region.

10. The light unit of claim 9, wherein the third density pattern region and the fourth density pattern region comprise a plurality of convex patterns that overlap each other or are spaced apart from each other.

11. The light unit of claim 10, wherein the convex patterns comprise polygonal pyramid patterns or hemispherical patterns.

12. The light unit of claim 9, wherein the first to fourth density pattern regions comprise convex or concave polygonal pyramid patterns, wherein a bottom inclination angle of the polygonal pyramid pattern has a value of 35 to 70 degrees.

13. The light unit of claim 1, wherein an optical film layer comprising a microlens array pattern is stacked on the first surface of the light guide member or on a top surface of the resin material layer formed on the first surface of the light guide member.

14. A light unit comprising:
a printed circuit board (PCB) mounted with a plurality of light emitting diodes (LEDs); and
a light guide member having a plurality of reception grooves receiving the LEDs;
wherein the reception grooves are filled with a resin material;
wherein the reception grooves are formed to pierce the light guide member, the light guide member includes a first surface and a second surface opposite to the first surface, and the first surface of the light guide member is further coated with the resin material;
wherein an optical film layer comprising a microlens array pattern is stacked on the first surface of the light guide member or on a top surface of the resin material layer formed on the first surface of the light guide member, and
wherein the optical film layer comprises a fifth density pattern region and a sixth density pattern region having a higher pattern density than the fifth density pattern region, and the sixth density pattern region is nearer to a light emission surface of the LED than is the fifth density pattern region.

15. The light unit of claim 14, wherein the resin material comprises a mixture of 10~21 wt % urethane acrylate oligomer and 10~21 wt % polyacryl.

16. The light unit of claim 15, wherein the resin material further comprises 10~21 wt % IBOA (isobornyl Acrylate), 10~21 wt % HPA (Hydroxypropyl Acrylate), and 10~21 wt % 2-HEA (2-Hydroxyethyl Acrylate).

17. The light unit of claim 16, wherein the resin material further comprises 1~5 wt % photo initiator and 0.5~1 wt % antioxidant.

* * * * *